(12) United States Patent
Qiu et al.

(10) Patent No.: US 11,410,344 B2
(45) Date of Patent: Aug. 9, 2022

(54) METHOD FOR IMAGE GENERATION, ELECTRONIC DEVICE, AND STORAGE MEDIUM

(71) Applicant: SHENZHEN SENSETIME TECHNOLOGY CO., LTD., Shenzhen (CN)

(72) Inventors: Haonan Qiu, Shenzhen (CN); Jinjin Gu, Shenzhen (CN); Sijie Ren, Shenzhen (CN); Xiaoguang Han, Shenzhen (CN)

(73) Assignee: SHENZHEN SENSETIME TECHNOLOGY CO., LTD., Shenzhen (CN)

( * ) Notice: Subject to any disclaimer, the term of this patent is extended or adjusted under 35 U.S.C. 154(b) by 144 days.

(21) Appl. No.: 17/078,709

(22) Filed: Oct. 23, 2020

(65) Prior Publication Data

US 2021/0042967 A1 Feb. 11, 2021

Related U.S. Application Data

(63) Continuation of application No. PCT/CN2019/114612, filed on Oct. 31, 2019.

(30) Foreign Application Priority Data

Feb. 2, 2019 (CN) .......................... 201910107428.9

(51) Int. Cl.
*G06T 11/00* (2006.01)
*G06T 7/73* (2017.01)
(Continued)

(52) U.S. Cl.
CPC .......... *G06T 11/001* (2013.01); *G06N 3/0454* (2013.01); *G06N 3/08* (2013.01);
(Continued)

(58) Field of Classification Search
CPC . G06T 7/11; G06T 5/002; G06T 2207/20024; G06T 2207/20068;
(Continued)

(56) References Cited

U.S. PATENT DOCUMENTS 6,208,763 B1 * 3/2001 Avinash ................. G06T 5/002
382/172
9,886,771 B1 2/2018 Chen et al.
(Continued)

FOREIGN PATENT DOCUMENTS

CN 102800129 A 11/2012
CN 103366400 A 10/2013
(Continued)

OTHER PUBLICATIONS

International Search Report in the international application No. PCT/CN2019/114612, dated Jan. 6, 2020, 2 pgs.
(Continued)

*Primary Examiner* — Ming Wu
(74) *Attorney, Agent, or Firm* — Cooper Legal Group, LLC

(57) ABSTRACT

A method for image generation, an electronic device and a storage medium are provided. The method includes: a first image of a target object is generated according to a line image of the target object; structure extraction is performed on the first image to obtain at least one of texture information or orientation information of the first image; and a second image of the target object is generated according to the at least one of the texture information or the orientation information.

17 Claims, 4 Drawing Sheets

(51) Int. Cl.
    *G06N 3/04*        (2006.01)
    *G06N 3/08*        (2006.01)
    *G06T 3/40*        (2006.01)
    *G06T 7/40*        (2017.01)

(52) U.S. Cl.
    CPC .............. *G06T 3/4046* (2013.01); *G06T 7/40* (2013.01); *G06T 7/73* (2017.01); *G06T 2207/20081* (2013.01); *G06T 2207/20084* (2013.01)

(58) Field of Classification Search
    CPC ................... G06T 11/001; G06T 17/00; G06T 2207/20072; G06T 2207/10028; G06T 2207/20016; G06T 2207/20021; G06T 7/00
    See application file for complete search history.

(56) References Cited

U.S. PATENT DOCUMENTS

| | | | |
|---|---|---|---|
| 2015/0084951 A1* | 3/2015 | Boivin | H04N 5/23229 345/419 |
| 2017/0308995 A1* | 10/2017 | Senzaki | G06T 7/168 |
| 2018/0005428 A1 | 1/2018 | Montero | |
| 2018/0307947 A1 | 10/2018 | Choi et al. | |
| 2018/0314716 A1 | 11/2018 | Kim et al. | |
| 2019/0025588 A1 | 1/2019 | Osterhout et al. | |
| 2019/0035149 A1* | 1/2019 | Chen | G06T 17/20 |
| 2019/0095698 A1 | 3/2019 | Cole et al. | |
| 2019/0295302 A1 | 9/2019 | Fu et al. | |

FOREIGN PATENT DOCUMENTS

| | | |
|---|---|---|
| CN | 105844706 A | 8/2016 |
| CN | 106683048 A | 5/2017 |
| CN | 107103619 A | 8/2017 |
| CN | 107886516 A | 4/2018 |
| CN | 108229494 A | 6/2018 |
| CN | 108229526 A | 6/2018 |
| CN | 108476278 A | 8/2018 |
| CN | 108495110 A | 9/2018 |
| CN | 108776959 A | 11/2018 |
| CN | 109166144 A | 1/2019 |
| CN | 109191402 A | 1/2019 |
| CN | 109191409 A | 1/2019 |
| CN | 109635745 A | 4/2019 |
| CN | 109816764 A | 5/2019 |
| CN | 110163193 A | 8/2019 |
| TW | I612433 B | 1/2018 |
| WO | 2018080702 A1 | 5/2018 |
| WO | 2019009007 A1 | 1/2019 |

OTHER PUBLICATIONS

"Latest Development of the Theory Framework"; Dec. 2018; Zeng-Shun Zhao, Han-Xu Gao, Qian Sun, Sheng-Hua Teng, Fa-Liang Chang and Dapeng Oliver Wu; Derivative Model and Application of Generative Adversarial Nets, Journal of Chinese Computer Systems, vol. 39, No. 12, 5 pgs.
"Two-phase Hair Image Synthesis by Self-Enhancing Generative Model"; Feb. 2019; Haonan Qiu, Chuan Wang, Hang Zhu, Ziangyu Zhu, Jnjin Gu, and Xiaoguang Han; Computer Science, Computer Vision and Pattern Recognition, 9 pgs.
First Office Action of the Chinese application No. 201910107428.9, dated Apr. 28, 2020, 17 pgs.
Notice of Allowance of the Chinese application No. 201910107428.9, dated Jun. 2, 2021, 5 pgs.
"Hand-Sketching Contour Based Image Retrieval on Mobile Device", Jan. 2019, Miao Yongwei, Lin Rong, Bao Chen, Zhang Xudong and Chen Jiazhou, Journal of Computer-Aided Design & Computer Graphics, vol. 31, No. 1, 9 pages.
"Convolutional Neural Networks for Subjective Face Attributes", 2018, Mei McCurrie, Fernando Beletti, Lucas Parzianello, Allen Westendorp, Samuel Anthony and Walter J. Scheirer, Image and Vision Computing, vol. 78, pp. 14-25.
English translation of the Written Opinion of the International Search Authority in the international application No. PCT/CN2019/114612, dated Jan. 6, 2020, 5 pgs.
Notice of Allowance of the Japanese application No. 2020-560202, dated Nov. 19, 2021, 5 pgs.
"Structure-Preserving Stereoscopic View Synthesis with Multi-Scale Adversarial Correlation Matching", 2019, Yu Zhang, Dongqing Zou, Jimmy S. Ren, Zhe Jiang and Xiaohao Chen, Proceedings of the IEEE/CVF Conference on Computer Vision and Pattern Recognition (CVPR), pp. 5860-5869.
International Search Report in the international application No. PCT/CN2019/101457, dated Jan. 8, 2020, 2 pgs.
English translation of the Written Opinion of the International Search Authority in the international application No. PCT/CN2019/101457, dated Jan. 8, 2020, 4 pgs.
"Adversarial Structure Matching Loss for Image Segmentation", May 2018, Jyh-Jing Hwang, Tsung-Wei Ke, Jianbo Shi and Stalia X. Yu, Computer Science, Computer Vision and Pattern Recognition, arXiv:1805.07457v1 [cs.CV], 10 pgs.
"SegAN: Adversarial Network with Multi-scale L1 Loss for Medical Image Segmentation", 2018, Yuan Xue, Tao Xu, Han Zhang, L. Rodney Long and Xiaolei Huang, Neuroinformatics, pp. 383-392.
First Office Action of the Chinese application No. 201910363957.5, dated Feb. 24, 2021, 38 pgs.
Second Office Action of the Chinese application No. 201910363957.5, dated Aug. 6, 2021, 15 pgs.
First Office Action of the Japanese application No. 2020-524341, dated Aug. 27, 2021, 11 pgs.
Notice of Allowance of the Japanese application No. 2020-524341, dated Feb. 7, 2022, 5 pgs.
Non-Final Office Action of the U.S. Appl. No. 16/857,337, dated Feb. 8, 2022, 26 pgs.
"Adversarial Structure Matching for Structured Prediction Tasks", Oct. 2019, Jyh-Jing Hwang, Tsung-Wei Ke, Jianbo Shi and Stelia X. Yu, Conference on Computer Vision and Pattern Recognition (CVPR), pp. 4056-4065.

* cited by examiner

METHOD FOR IMAGE GENERATION, ELECTRONIC DEVICE, AND STORAGE MEDIUM

CROSS-REFERENCE TO RELATED APPLICATION

This application is a continuation application of PCT Application No. PCT/CN2019/114612, filed on Oct. 31, 2019, which claims priority to Chinese patent application No. 201910107428.9, filed on Feb. 2, 2019 and entitled "Method and Device for Image Generation, Electronic Device and Storage Medium". The contents of PCT Application No. PCT/CN2019/114612 and Chinese patent application No. 201910107428.9 are hereby incorporated by reference in their entireties.

TECHNICAL FIELD

The disclosure relates to the field of computer technologies, and particularly to a method and device for image generation, an electronic device and a storage medium.

BACKGROUND

In the field of computer technologies, realistic hair generation is important and difficult problem. Once the hair, which serves as an obvious feature of a portrait, cannot be realistically rendered, a generation effect of the whole portrait is influenced.

SUMMARY

The disclosure discloses technical solutions to image generation.

In a first aspect, a method for image generation is provided, which may include that: a first image of a target object is generated according to a line image of the target object; structure extraction is performed on the first image to obtain at least one of texture information or orientation information of the first image; and a second image of the target object is generated according to the at least one of the texture information or the orientation information.

In a second aspect, a device for image generation is provided, which may include: a first generation module, configured to generate a first image of a target object according to a line image of the target object; a structure extraction module, configured to perform structure extraction on the first image to obtain at least one of texture information or orientation information of the first image; and a second generation module, configured to generate a second image of the target object according to the at least one of the texture information or the orientation information.

In a third aspect, an electronic device is provided, which may include a processor and a memory configured to store an instruction executable by the processor, the processor is configured to generate a first image of a target object according to a line image of the target object; perform structure extraction on the first image to obtain at least one of texture information or orientation information of the first image; and generate a second image of the target object according to the at least one of the texture information or the orientation information.

In a fourth aspect, there is provided a non-transitory computer-readable storage medium, having stored thereon a computer program instruction that, when executed by a processor of an electronic device, causes the processor to execute a method for image generation including: generating a first image of a target object according to a line image of the target object; performing structure extraction on the first image to obtain at least one of texture information or orientation information of the first image; and generating a second image of the target object according to the at least one of the texture information or the orientation information.

In a fifth aspect, a computer program is provided, which may include a computer-readable code that, when being run in an electronic device, causes a processor in the electronic device to execute the aforementioned method for image generation.

It should be understood that the above general description and the following detailed description are only exemplary and explanatory and not intended to limit the disclosure.

According to the following detailed descriptions made to exemplary embodiments with reference to the drawings, other features and aspects of the disclosure will become clear.

BRIEF DESCRIPTION OF THE DRAWINGS

The accompanying drawings, which are incorporated in and constitute a part of the specification, illustrate embodiments consistent with the disclosure and, together with the specification, serve to describe the technical solutions of the disclosure.

DETAILED DESCRIPTION

Figure 1:
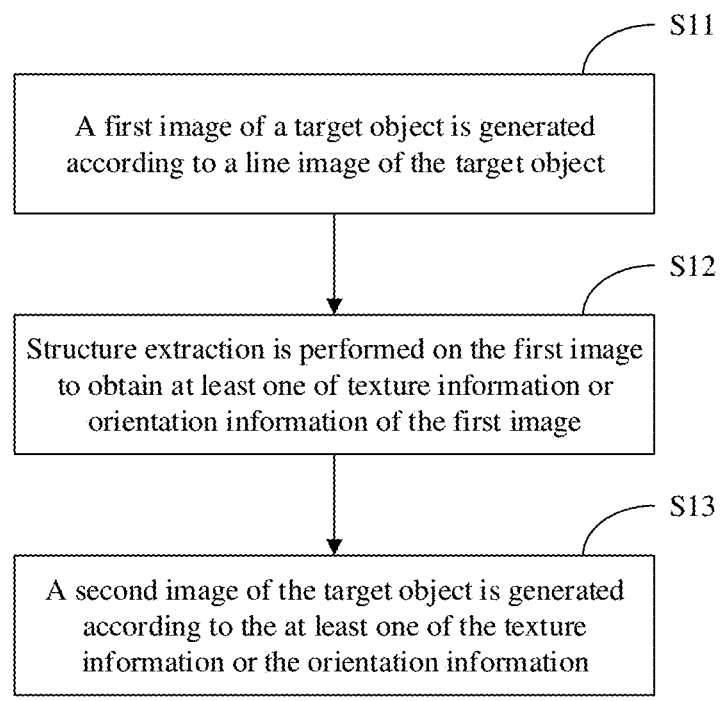
FIG. 1 is a flowchart of a method for image generation according to an embodiment of the disclosure.

Each exemplary embodiment, feature and aspect of the disclosure will be described below with reference to the drawings in detail. The same reference signs in the drawings represent components with the same or similar functions. Although each aspect of the embodiments is illustrated in the drawings, the drawings are not required to be drawn to scale, unless otherwise specified.

Herein, the special term "exemplary" means "use as an example, embodiment or description". Herein, any embodiment described as "exemplary" may not be explained to be superior to or better than other embodiments.

In the disclosure, the term "and/or" is only an association relationship describing associated objects and represents that three relationships may exist. For example, A and/or B may represent three conditions: i.e., independent existence of A, existence of both A and B and independent existence of B. In addition, the term "at least one" in the disclosure represents any one of multiple or any combination of at least two of multiple. For example, including at least one of A, B or C may represent including any one or more elements selected from a set formed by A, B and C.

In addition, for describing the disclosure better, many specific details are presented in the following specific implementation modes. It is understood by those skilled in the art that the disclosure may still be implemented even without some specific details. In some examples, methods, means, components and circuits known very well to those skilled in the art are not described in detail, to highlight the subject of the disclosure.

FIG. 1 is a flowchart of a method for image generation according to an embodiment of the disclosure. As illustrated in FIG. 1, the method for image generation includes the following operations.

In S11, a first image of a target object is generated according to a line image of the target object.

In S12, structure extraction is performed on the first image to obtain at least one of texture information or orientation information of the first image.

In S13, a second image of the target object is generated according to the at least one of the texture information or the orientation information.

According to the embodiment of the disclosure, a preliminary object image is generated according to the line image of the object, at least one of texture information or orientation information of the preliminary image is extracted, and a real object image is generated according to the at least one of the texture information or the orientation information, so that the generated image is more realistic, the arithmetic speed is increased, and the object image is generated simply and rapidly.

In a possible implementation mode, the method for image generation may be performed by an electronic device such as a terminal device or a server. The terminal device may be User Equipment (UE), a mobile device, a user terminal, a terminal, a cell phone, a cordless phone, a Personal Digital Assistant (PDA), a handheld device, a computing device, a vehicle device, a wearable device, or the like. The method may be implemented in a manner that a processor calls a computer-readable instruction stored in a memory. Or, the method may be performed by the server.

In a possible implementation mode, the target object includes hair, and the line image of the target object at least includes a contour line and an orientation line of the hair. Here, the target object may be an object such as hair of a person or hair of an animal, the line image of the target object may include the contour line of the target object and the orientation line representing general directions of hair strands. For example, the line image may be a stick figure (or called hand-drawn sketch) of the target object. If the target object is the hair of the person, the line image thereof may be a stick figure including the contour line and the orientation line of the hair. Here, the orientation line may be represented with some simple lines, for determining the general directions of the hair strands.

In a possible implementation mode, the line image of the target object may be an image pre-stored in the terminal or the server or an image downloaded from the Internet, or may be a collected line image drawn by a user. For example, the user may select, from a photo displayed on the terminal, a region where the hair is required to be generated and draw the general directions of the hair strands. The terminal may collect the line image drawn by the user.

In a possible implementation mode, the first image of the target object is generated according to the line image of the target object in S11. That is, analysis processing may be performed on the line image of the target object to generate the first image of the target object. For example, feature extraction may be performed on the line image of the target object to obtain feature information, and the first image of the target object is generated according to the feature information. A manner for generating the first image is not limited in the disclosure.

In a possible implementation mode, structure extraction is performed on the first image to obtain the at least one of the texture information or the orientation information of the first image in S12. Here, the texture information may represent a linear texture of the target object (for example, a texture of the hair strand), and the orientation information may represent a line direction of the target object (for example, the direction of the hair strand). A manner for structure extraction is not limited in the disclosure.

In a possible implementation mode, S12 may include that: filtering processing is performed on each pixel of the first image to obtain a filtering result of the pixel; and the at least one of the texture information or the orientation information of the first image is determined according to the filtering result of each pixel.

Here, the filtering processing may eliminate a noise of each pixel to facilitate determination of at least one of texture information or orientation information of each pixel. The filtering processing is performed on each pixel of the first image to obtain the filtering result of the pixel; and the at least one of texture information or the orientation information of each pixel is determined according to the filtering result of the pixel, thereby determining the at least one of the texture information or the orientation information of the first image. A manner for filtering processing is not limited in the disclosure.

In such a manner, the at least one of the texture information or orientation information of the first image is determined according to the filtering result of each pixel, so that the information extraction accuracy is improved.

In a possible implementation mode, the operation that filtering processing is performed on each pixel of the first image to obtain the filtering result of the pixel may include that: filtering processing is performed on each pixel according to multiple preset angles to obtain multiple filtering results of the pixel. Here, a filter for filtering processing is, for example, a Gabor filter.

For example, multiple angles θ may be preset as angles of Gabor filters. According to different values of the angles θ, multiple different Gabor filters may be formed. The filtering processing may be performed on each pixel of the first image through the multiple Gabor filters to obtain multiple filtering results of the pixel. For example, the multiple preset angles may be eight values at equal intervals between 0° and 180°: 0°, 22.5°, 45°, 67.5°, 90°, 112.5°, 135° and 157.5°, so that eight different Gabor filters may be formed. For each pixel of the first image, the filtering processing may be performed on the pixel through the eight Gabor filters to obtain eight filtering results of the pixel. It should be understood that those skilled in the art may set the multiple preset angles according to a practical condition and no limits are made thereto in the disclosure.

In such a manner, filtering processing may be performed on each pixel of the first image from multiple angles to obtain filtering results of the pixel in the multiple directions.

In a possible implementation mode, the operation that the at least one of the texture information or the orientation information of the first image is determined according to the filtering result of each pixel may include that: the texture information of the first image is determined according to a maximum value in the multiple filtering results of each pixel, and/or the orientation information of the first image is determined according to an angle corresponding to the maximum value in the multiple filtering results of each pixel.

For example, if the target object is the hair, each pixel may be filtered through the Gabor filters to obtain the multiple filtering results of the pixel. If the direction of the hair strand is closer to the value of the angle θ of the Gabor filter, which indicates that a matching degree between the direction of the hair strand and the angle θ is higher, and a value of the corresponding filtering result is higher. That is, if the direction of the hair strand of the target object is closer to the value of θ, the value of the filtering result is higher; if the direction of the hair strand of the target object is more deviated from the value of θ, the value of the filtering result is lower. A maximum value extraction operation may be performed on the multiple filtering results of each pixel to obtain the texture information of the first image, and the angle corresponding to the maximum value in the multiple filtering results of each pixel may be determined as the orientation information of the first image.

By determining the maximum value (i.e., the filtering result closest to the direction of the hair strand) from the multiple filtering results, thereby ensuring that the at least one of the texture information or the orientation information of the first image is more accurate.

In a possible implementation mode, S12 may include that: first filtering processing is performed on each pixel of the first image to obtain a first filtering result of the pixel; at least one of preliminary texture information or preliminary orientation information of each pixel is determined according to the first filtering result of the pixel; second filtering processing is performed on the at least one of the preliminary texture information or the preliminary orientation information of each pixel to obtain a second filtering result of the pixel; and the at least one of the texture information or the orientation information of the first image is determined according to the second filtering result of each pixel.

The first filtering processing is performed on each pixel of the first image to obtain the at least one of the preliminary texture information or the preliminary orientation information, and the second filtering processing is performed on the at least one of the preliminary texture information or the preliminary orientation information of each pixel to obtain the at least one of the texture information or the orientation information of the first image, so that blurred and stained regions can further be reduced, and a texture and orientation of the first image are clearer.

In a possible implementation mode, the operation that first filtering processing is performed on each pixel of the first image to obtain the first filtering result of the pixel may include that: first filtering processing (first Gabor filters may be used for the first filtering processing) is performed on each pixel according to multiple preset angles to obtain multiple first filtering results of the pixel. For example, eight values at equal intervals between 0° and 180° may be determined as angles θ of the first Gabor filters, so that eight different first Gabor filters may be formed. For each pixel of the first image, first filtering processing may be performed on the pixel through the eight first Gabor filters to obtain eight first filtering results of the pixel.

In a possible implementation mode, the operation that the at least one of the preliminary texture information or the preliminary orientation information of each pixel is determined according to the first filtering result of the pixel may include that: the preliminary texture information of each pixel is determined according to a maximum value in the multiple first filtering results of the pixel, and/or the preliminary orientation information of each pixel is determined according to an angle corresponding to the maximum value in the multiple first filtering results of the pixel. For example, if the target object is the hair, the first filtering processing may be performed on each pixel through the first Gabor filters. If the direction of the hair strand of the target object is closer to the value of θ, a value of the first filtering result is higher; if the direction of the hair strand of the target object is more deviated from the value of θ, the value of the first filtering result is lower. The maximum value extraction operation may be performed on the multiple first filtering results of each pixel to obtain the preliminary texture information of the pixel, and the angle corresponding to the maximum value in the multiple first filtering results of each pixel may be determined as the preliminary orientation information of the pixel.

By determining the maximum value (i.e., the first filtering result closest to the direction of the hair strand) from the multiple first filtering results, thereby ensuring that the at least one of the preliminary texture information or the preliminary orientation information of each pixel is more accurate.

In a possible implementation mode, the operation that second filtering processing is performed on the at least one of the preliminary texture information or the preliminary orientation information of each pixel to obtain the second filtering result of the pixel may include that: second filtering processing (second Gabor filters may be used for the second filtering processing) is performed on the at least one of the preliminary texture information or the preliminary orientation information of each pixel according to multiple preset angles to obtain multiple second filtering results of the pixel. For example, eight values at equal intervals between 0° and 180° may be determined as angles θ of the second Gabor filters, so that eight different second Gabor filters may be formed. For the at least one of the preliminary texture information or the preliminary orientation information of each pixel, the second filtering processing may be performed on the at least one of the preliminary texture information or the preliminary orientation information of the pixel through the eight second Gabor filters to obtain eight second filtering results of the pixel.

In a possible implementation mode, the operation that the at least one of the texture information or the orientation information of the first image is determined according to the second filtering result of each pixel may include that: the texture information of the first image is determined according to a maximum value in the multiple second filtering results of each pixel, and/or the orientation information of the first image is determined according to an angle corresponding to the maximum value in the multiple second filtering results of each pixel. For example, when the target object is the hair, the second filtering processing may be performed on the at least one of the preliminary texture information or the preliminary orientation information of each pixel through the second Gabor filters. If the direction of hair strand of the target object is closer to the value of θ, a value of the second filtering result is higher; if the direction of the hair strand of the target object is more deviated from the value of θ, the value of the second filtering result is lower. The maximum value extraction operation may be performed on the multiple second filtering results of each pixel to obtain the texture information of the first image, and the angle corresponding to the maximum value in the multiple second filtering results of each pixel may be determined as the orientation information of the first image.

By determining the maximum value (i.e., the second filtering result closest to the hair orientation) from the multiple second filtering results, thereby ensuring that at least one of the texture or the orientation of the first image is clearer.

In a possible implementation mode, the method may be implemented through a neural network, the neural network includes a first generation network and a second generation network, the first generation network may be configured to generate the first image, and the second generation network may be configured to generate the second image.

Figure 2:
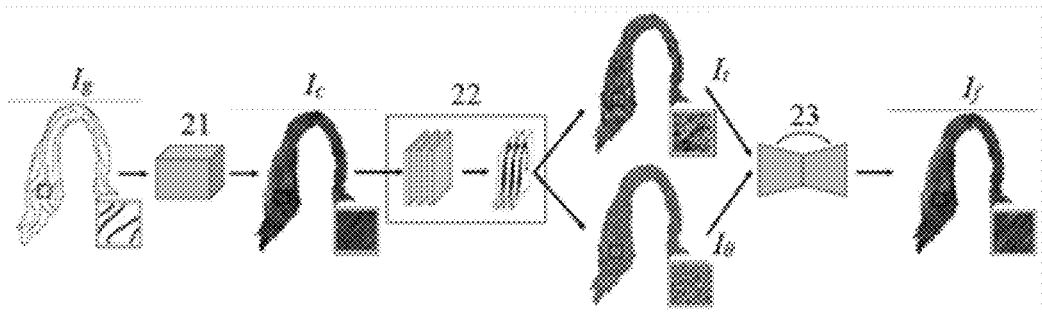
FIG. 2 is a structure diagram of a neural network according to an embodiment of the disclosure.

FIG. 2 is a structure diagram of a neural network according to an embodiment of the disclosure. As illustrated in FIG. 2, the neural network includes a first generation network 21, a structure extraction layer 22 and a second generation network 23.

In a possible implementation mode, as illustrated in FIG. 2, the line image of the target object may be a line image of a hairstyle (for example, a stick figure). The line image $I_g$ of the target object is input into the first generation network 21 for processing to generate the first image $I_c$. The first image $I_c$ is input into the structure extraction layer 22 for processing to obtain at least one of texture information $I_t$ or orientation information $I_\theta$ of the first image $I_c$. The at least one of the texture information $I_t$ or the orientation information $I_\theta$ is input into the second generation network 23 for processing to generate the second image $I_f$ of the target object.

In a possible implementation mode, the first generation network may include a first convolutional subnetwork and a first deconvolution subnetwork, and S11 may include that: the line image is input into the first convolutional subnetwork for down-sampling, and first feature information of the line image is output; and the first feature information is input into the first deconvolution subnetwork for up-sampling, and the first image is output.

Figure 3:
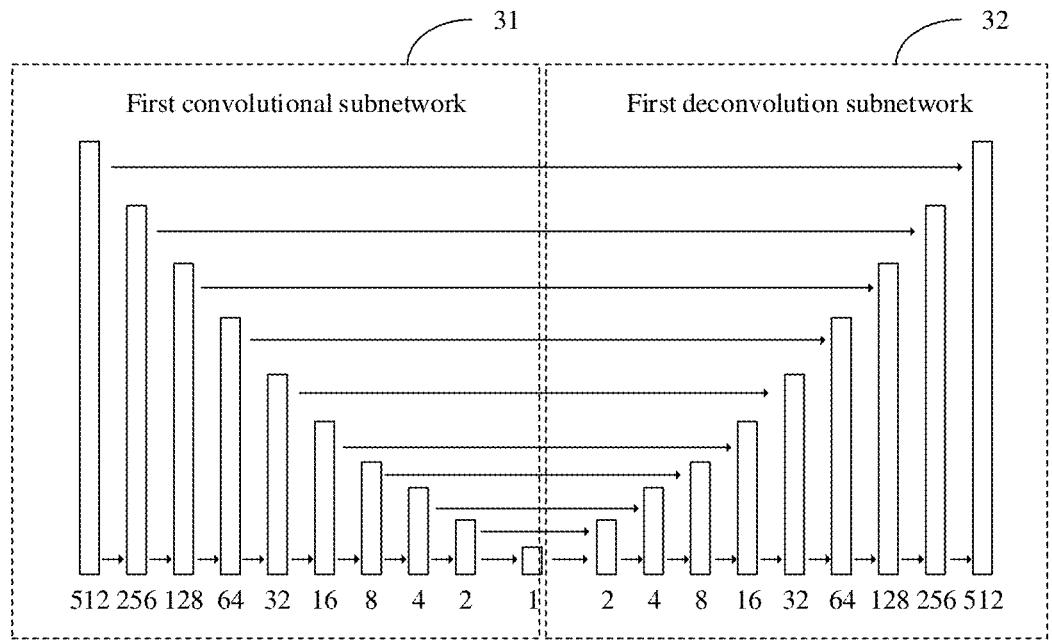
FIG. 3 is a schematic diagram of a U-Net according to an embodiment of the disclosure.

FIG. 3 is a schematic diagram of a U-Net according to an embodiment of the disclosure. In a possible implementation mode, as illustrated in FIG. 3, the first generation network may be a U-Net, and includes a first convolutional subnetwork 31 and a first deconvolution subnetwork 32. The first convolutional subnetwork 31 may include, for example, convolutional layers each having a convolution kernel of 4*4 and a stride of 2. The first deconvolution subnetwork 32 may include, for example, deconvolution layers each having a convolution kernel of 4*4 and a stride of 2. The line image $I_g$ (for example, with 512*512 pixels) may be input into the first generation network for processing. At first, the first convolutional subnetwork 31 performs convolution on the line image $I_g$ through the convolutional layers each having the convolution kernel of 4*4 and the stride of 2 to gradually reduce a size of feature information of the line image $I_g$ to 256, 128, 64, 32, 16, 8, 4, 2 and 1 in a down-sampling process, and outputs the first feature information of the line image $I_g$. Then, the first feature information and feature information corresponding to each convolutional layer of the first convolutional subnetwork are input into the first deconvolution subnetwork 32 for processing. The first deconvolution subnetwork 32 may gradually perform up-sampling on the first feature information to 2, 4, 8, 16, 32, 64, 128, 256 and 512 through the deconvolution layers each having the convolution kernel of 4*4 and the stride of 2 to obtain the first image $I_c$ of the target object.

In a possible implementation mode, the second generation network may include a second convolutional subnetwork and a second deconvolution subnetwork, and S13 may include that: the at least one of the texture information or the orientation information is input into the second convolutional subnetwork for down-sampling, and second feature information is output; and the second feature information is input into the second deconvolution subnetwork for up-sampling, and the second image is output.

In a possible implementation mode, the second generation network may also be a U-Net illustrated in FIG. 3, and includes a second convolutional subnetwork and a second deconvolution subnetwork. The second convolutional subnetwork may include, for example, convolutional layers each having a convolution kernel of 4*4 and a stride of 2. The second deconvolution subnetwork may include, for example, deconvolution layers each having a convolution kernel of 4*4 and a stride of 2. The texture information $I_t$ and/or the orientation information $I_\theta$ of the first image $I_c$ may be combined and input into the second generation network for processing. At first, the second convolutional subnetwork performs convolution on the input information line through the convolutional layers each having the convolution kernel of 4*4 and the stride of 2 to gradually reduce a size of the input information to 256, 128, 64, 32, 16, 8, 4, 2 and 1 during down-sampling, and outputs the second feature information. Then, the second feature information and feature information corresponding to each convolutional layer of the second convolutional subnetwork are input into the second deconvolution subnetwork for processing. The second deconvolution subnetwork may gradually perform up-sampling on the second feature information to 2, 4, 8, 16, 32, 64, 128, 256 and 512 through the deconvolution layers each having the convolution kernel of 4*4 and the stride of 2 to obtain the second image $I_f$ of the target object.

In a possible implementation mode, the neural network may further include a discriminative network D (not illustrated in FIG. 2); and the method may further include that: adversarial training is performed on the first generation network, the second generation network and the discriminative network according to a preset training set, here, the training set includes multiple third images and a respective one of reference images corresponding to each of the third images, the third image is a line image and the reference image is a real image.

In a possible implementation mode, before the second image is generated through the first generation network and the second generation network, adversarial training may be performed on the first generation network, the second generation network and the discriminative network according to the preset training set. The training set may include the multiple third images (line images) and a respective one of the reference images (real images) corresponding to each of the third images. For example, the third image may be input into the neural network (including the first generation network and the second generation network) for processing to obtain an output image of the third image, and then the output image of the third image and the reference image corresponding to the third image are input into the discriminative network for discrimination to obtain a discrimination result.

In a process of the adversarial training, the first generation network and the second generation network try to generate a result close to the reference image of the third image, and the discriminative network tries to distinguish the output image of the third image from the reference image corresponding to the third image.

Adversarial training may be performed on the first generation network, the second generation network and the discriminative network for many times to gradually improve the performance thereof, thereby generating a more realistic image through the first generation network and the second generation network.

In a possible implementation mode, two discriminative networks D1 and D2 respectively corresponding to the first generation network G1 and the second generation network G2 may also be set, so as to separately perform adversarial training of two groups of generation-discrimination networks. That is, adversarial training may be performed on the first generation network G1 and the discriminative network D1 according to the preset training set at first. After the training of the first generation network G1 is completed, adversarial training is performed on the second generation network G2 and the discriminative network D2 by use of a generated image obtained by the first generation network G1 that has been trained, thereby completing the whole training process. A specific training manner for the first generation network and the second generation network is not limited in the disclosure.

In a possible implementation mode, the neural network may be trained through a loss function, and a network parameter value may be fine-tuned to in the direction of minimizing the loss function. When the loss function is reduced to a certain degree or converges in a certain threshold value, training may be stopped to obtain a trained neural network.

In a possible implementation mode, the operation that adversarial training is performed on the first generation network, the second generation network and the discriminative network according to the preset training set may include that: the third image in the training set is input into the first generation network to generate a fourth image; structure extraction is performed on the fourth image through a filter to obtain at least one of texture information or orientation information of the fourth image; the at least one of the texture information or the orientation information of the fourth image is input into the second generation network to generate a fifth image; the reference image of the third image and the fifth image are input into the discriminative network, and a discrimination result is output; network loss of the neural network is determined according to the reference image, the fourth image, the fifth image and the discrimination result; and the first generation network, the second generation network and the discriminative network are trained according to the network loss.

In such a manner, in the training process, a network parameter may be continually fine-tuned according to the loss function, so that the training of the first generation network, the second generation network and the discriminative network is more effective.

It should be understood that those skilled in the art may set the loss function used in the training process according to a practical condition and no limits are made thereto in the disclosure.

In a possible implementation mode, the operation that the network loss of the neural network is determined according to the reference image, the fourth image, the fifth image and the discrimination result may include that: pixel loss of the neural network is determined according to the reference image, the fourth image and the fifth image; adversarial loss of the neural network is determined according to the discrimination result; style loss of the neural network is determined according to the reference image, the fourth image, the fifth image and a trained convolutional network; and the network loss of the neural network is determined according to the pixel loss, the adversarial loss and the style loss.

In a possible implementation mode, the pixel loss of the neural network may be determined according to the reference image, the fourth image and the fifth image. The pixel loss $L_{pixel}$ of the neural network may be determined through the following formula (1):

$$L_{pixel}=\|\hat{y}-y\|_1 \quad (1).$$

In the formula (1), $\hat{y}$ represents the fourth image or the fifth image, and y represents the reference image.

In a possible implementation mode, the adversarial loss of the neural network may be determined according to the discrimination result. The adversarial loss $L_{adv}$ of the neural network may be determined through the following formula (2):

$$L_{adv}=\log D(G(x)) \quad (2).$$

In the formula (2), x represents the third image, G represents at least one of the first generation network or the second generation network, and D represents the discriminative network.

In a possible implementation mode, the style loss of the neural network may be determined according to the reference image, the fourth image, the fifth image and a trained convolutional network. The style loss $L_{style}$ of the neural network may be determined through the following formula (3):

$$L_{style}=\|\Sigma_{i=1}^{n}\text{Gram}(F_i(\hat{y}))-\text{Gram}(F_i(y))\|_2 \quad (3).$$

In the formula (3), F is the trained convolutional network that may be configured to extract, in each convolutional layer, feature information of a respective scale of an input picture, $F_i(\hat{y})$ represents feature information, extracted in the ith layer, of the fourth image or the fifth image $\hat{y}$, $F_i(y)$ represents feature information, extracted in the ith layer, of the reference image y, Gram represents a Gram operational matrix, and n represents the number of the convolutional layers of the convolutional network F.

In a possible implementation mode, the network loss of the neural network may be determined according to the pixel loss, the adversarial loss and the style loss. The network loss L1 of the neural network may be determined through the following formula (4):

$$L1=w_1 L_{pixel}+w_2 L_{adv}, w_3 L_{style} \quad (4).$$

In the formula (4), $w_1$, $w_2$ and $w_3$ represent weights of the pixel loss $L_{pixel}$, the adversarial loss $L_{adv}$ and the style loss $L_{style}$, respectively. Those skilled in the art may set values of $w_1$, $w_2$ and $w_3$ according to the practical condition, and no limits are made thereto in the disclosure.

Under the condition that the network loss is determined based on the fourth image, when the network parameter is reversely fine-tuned, only a network parameter of the first generation network is fined-tuned. Under the condition that the network loss is determined based on the fifth image, when the network parameter is reversely fine-tuned, network parameters of the first generation network and the second generation network are simultaneously fine-tuned.

The network loss is determined based on the pixel loss, the adversarial loss and the style loss, so that sources of the network loss are more specific, the fine-tuning of the parameter is more targeted, and furthermore, training efficiency of the first generation network, the second generation network and the discriminative network is improved.

In a possible implementation mode, the operation that the network loss of the neural network is determined according to the reference image, the fourth image, the fifth image and the discrimination result may further include that: feature matching loss of the neural network is determined according to the reference image, the fourth image, the fifth image and the discriminative network; and the network loss of the neural network is determined according to the pixel loss, the adversarial loss, the style loss and the feature matching loss.

In a possible implementation mode, the reference image, the fourth image and the fifth image may be input into the discriminative network for processing. The feature information of the reference image and the fourth image or the fifth image may be matched in each layer of the discriminative network. The feature matching loss $L_{FM}$ of the neural network may be determined through the following formula (5):

$$L_{FM} = \sum_{j=1}^{T} \frac{1}{N_j} \|D_j(y) - D_j(\hat{y})\|_1. \quad (5)$$

In the formula (5), D represents the discriminative network, $D_j(y)$ represents a feature map of the reference image y in the jth layer, $D_j(\hat{y})$ represents a feature map of the fourth image or the fifth image $\hat{y}$ in the jth layer, $N_j$ represents the amount of feature information in the jth layer, and T represents the total number of layers of the discriminative network D.

In a possible implementation mode, the network loss of the neural network may be determined according to the pixel loss, the adversarial loss, the style loss and the feature matching loss. The network loss L2 of the neural network may be determined through the following formula (6):

$$L2 = w_1 L_{pixel} + w_2 L_{adv} + w_3 L_{style} + w_4 L_{FM} \quad (6).$$

In the formula (6), $w_1$, $w_2$, $w_3$ and $w_4$ represent the weights of the pixel loss $L_{pixel}$, the adversarial loss $L_{adv}$, the style loss $L_{style}$ and the feature matching loss $L_{FM}$, respectively. Those skilled in the art may set values of $w_1$, $w_2$, $w_3$ and $w_4$ according to the practical condition, and no limits are made thereto in the disclosure.

Under the condition that the network loss is determined based on the fourth image, when the network parameter is reversely fine-tuned, only the network parameter of the first generation network is fine-tuned. Under the condition that the network loss is determined based on the fifth image, when the network parameter is reversely fine-tuned, the network parameters of the first generation network and the second generation network are simultaneously fine-tuned.

In such a manner, the feature matching loss may be added into the network loss, thereby improving the network training efficiency.

According to the method for image generation of the embodiments of the disclosure, the object image with a realistic effect may be generated simply and rapidly according to the line image of the target object (for example, the hair). The embodiments according to the disclosure can be applied to products for rapid hairstyle generation, hairstyle edition and the like and corresponding application scenarios, not only the hair edition speed is increased, but also a more realistic image is generated.

It can be understood that each method embodiment mentioned in the disclosure may be combined to form combined embodiments without departing from principles and logics. For saving the space, elaborations are omitted in the disclosure.

Figure 4:
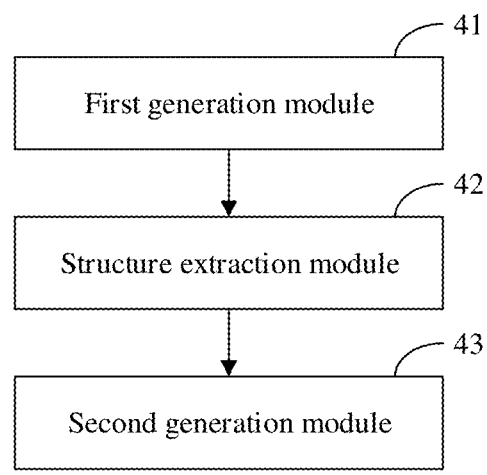
FIG. 4 is a block diagram of a device for image generation according to an embodiment of the disclosure.

FIG. 4 is a block diagram of a device for image generation according to an embodiment of the disclosure. As illustrated in FIG. 4, the device for image generation includes a first generation module 41, a structure extraction module 42 and a second generation module 43.

The first generation module 41 is configured to generate a first image of a target object according to a line image of the target object.

The structure extraction module 42 is configured to perform structure extraction on the first image to obtain at least one of texture information or orientation information of the first image.

The second generation module 43 is configured to generate a second image of the target object according to the at least one of the texture information or the orientation information.

In a possible implementation mode, the structure extraction module 42 includes: a first filtering processing submodule, configured to perform filtering processing on each pixel of the first image to obtain a filtering result of the pixel; and a first information determination submodule, configured to determine the at least one of the texture information or the orientation information of the first image according to the filtering result of each pixel.

In a possible implementation mode, the structure extraction module 42 includes: a second filtering processing submodule, configured to perform first filtering processing on each pixel of the first image to obtain a first filtering result of the pixel; a second information determination submodule, configured to determine, according to the first filtering result of each pixel, at least one of preliminary texture information or preliminary orientation information of the pixel; a third filtering processing submodule, configured to perform second filtering processing on the at least one of the preliminary texture information or the preliminary orientation information of each pixel to obtain a second filtering result of the pixel; and a third information determination submodule, configured to determine the at least one of the texture information or the orientation information of the first image according to the second filtering result of each pixel.

In a possible implementation mode, the first filtering processing submodule is configured to perform filtering processing on each pixel according to multiple preset angles to obtain multiple filtering results of the pixel; and the first information determination submodule is configured to: determine the texture information of the first image according to a maximum value in the multiple filtering results of each pixel, and/or, determine the orientation information of the first image according to an angle corresponding to the maximum value in the multiple filtering results of each pixel.

In a possible implementation mode, the second filtering processing submodule is configured to perform first filtering processing on each pixel according to multiple preset angles to obtain multiple first filtering results of the pixel; and the second information determination submodule is configured to determine: the preliminary texture information of each pixel according to a maximum value in the multiple first filtering results of the pixel, and/or, determine the preliminary orientation information of each pixel according to an angle corresponding to the maximum value in the multiple first filtering results of the pixel.

In a possible implementation mode, the third filtering processing submodule is configured to perform second filtering processing on the at least one of the preliminary texture information or the preliminary orientation information of each pixel according to multiple preset angles to obtain multiple second filtering results of the pixel; and the third information determination submodule is configured to: determine the texture information of the first image according to a maximum value in the multiple second filtering results of each pixel, and/or, determine the orientation information of the first image according to an angle corresponding to the maximum value in the multiple second filtering results of each pixel.

In a possible implementation mode, the device includes a neural network, the neural network includes a first generation network and a second generation network, the first generation network is configured to generate the first image, and the second generation network is configured to generate the second image.

In a possible implementation mode, the first generation network includes a first convolutional subnetwork and a first deconvolution subnetwork, and the first generation module 41 includes: a first feature determination submodule, configured to input the line image into the first convolutional subnetwork for down-sampling and output first feature information of the line image; and a first image generation submodule, configured to input the first feature information into the first deconvolution subnetwork for up-sampling and output the first image.

In a possible implementation mode, the second generation network includes a second convolutional subnetwork and a second deconvolution subnetwork, and the second generation module 43 includes: a second feature determination submodule, configured to input the at least one of the texture information or the orientation information into the second convolutional subnetwork for down-sampling and output second feature information; and a second image generation submodule, configured to input the second feature information into the second deconvolution subnetwork for up-sampling and output the second image.

In a possible implementation mode, the neural network further includes a discriminative network; and the device further includes a training module, configured to perform adversarial training on the first generation network, the second generation network and the discriminative network according to a preset training set, here, the training set includes multiple third images and a respective reference image corresponding to each third image, the third image is a line image and the reference image is a real image.

In a possible implementation mode, the training module includes: a third image generation submodule, configured to input the third image in the training set into the first generation network to generate a fourth image; a structure extraction submodule, configured to perform structure extraction on the fourth image through a filter to obtain at least one of texture information or orientation information of the fourth image; a fourth image generation submodule, configured to input the at least one of the texture information or the orientation information of the fourth image into the second generation network to generate a fifth image; a discrimination submodule, configured to input the reference image of the third image and the fifth image into the discriminative network and output a discrimination result; a loss determination submodule, configured to determine network loss of the neural network according to the reference image, the fourth image, the fifth image and the discrimination result; and a training submodule, configured to train the first generation network, the second generation network and the discriminative network according to the network loss.

In a possible implementation mode, the loss determination submodule is configured to determine pixel loss of the neural network according to the reference image, the fourth image and the fifth image, determine adversarial loss of the neural network according to the discrimination result, determine style loss of the neural network according to the reference image, the fourth image, the fifth image and a trained convolutional network and determine the network loss of the neural network according to the pixel loss, the adversarial loss and the style loss.

In a possible implementation mode, the loss determination submodule is further configured to determine feature matching loss of the neural network according to the reference image, the fourth image, the fifth image and the discriminative network and determine the network loss of the neural network according to the pixel loss, the adversarial loss, the style loss and the feature matching loss.

In a possible implementation mode, the target object includes hair, and the line image of the target object at least includes a contour line and an orientation line of the hair.

In some embodiments, functions or modules of the device provided in the embodiment of the disclosure may be configured to execute each method described in the above method embodiments, and specific implementation thereof may refer to the descriptions about the method embodiments and, for simplicity, will not be elaborated herein.

An embodiment of the disclosure also discloses a computer-readable storage medium, having stored thereon a computer program instruction that, when executed by a processor, causes the processor to implement the aforementioned method. The computer-readable storage medium may be a nonvolatile computer-readable storage medium or a volatile computer-readable storage medium.

An embodiment of the disclosure also discloses an electronic device, which includes a processor and a memory configured to store an instruction executable by the processor, here, the processor is configured to perform the aforementioned method.

An embodiment of the disclosure also discloses a computer program, which includes a computer-readable code that, when being run in an electronic device, causes a processor in the electronic device to execute the aforementioned method.

The electronic device may be provided as a terminal, a server or a device in another form.

Figure 5:
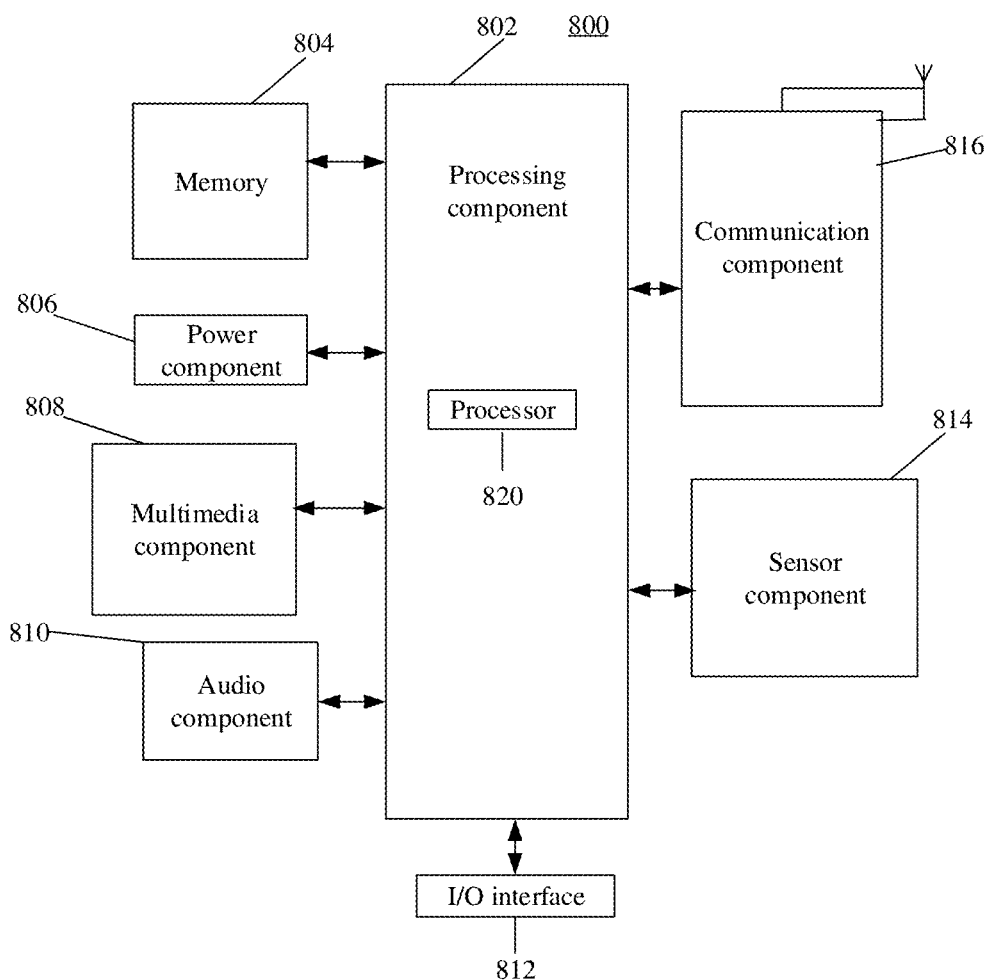
FIG. 5 is a block diagram of an electronic device according to an embodiment of the disclosure.

FIG. 5 is a block diagram of an electronic device 800 according to an embodiment of the disclosure. For example, the electronic device 800 may be a terminal such as a mobile phone, a computer, a digital broadcast terminal, a messaging device, a gaming console, a tablet device, a medical device, exercise equipment and a Personal Digital Assistant (PDA).

Referring to FIG. 5, the electronic device 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the electronic device 800, such as the operations associated with display, telephone calls, data communications, camera operations, and recording operations. The processing component 802 may include one or more processors 820 to execute instructions to perform all or part of the operations in the abovementioned method. Moreover, the processing component 802 may include one or more modules which facilitate interaction between the processing component 802 and the other components. For instance, the processing component 802 may include a multimedia module to facilitate interaction between the multimedia component 808 and the processing component 802.

The memory 804 is configured to store various types of data to support the operation of the electronic device 800. Examples of such data include instructions for any application programs or methods operated on the electronic device 800, contact data, phonebook data, messages, pictures, video, etc. The memory 804 may be implemented by a volatile or nonvolatile storage device of any type or a combination thereof, for example, a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The power component 806 provides power for various components of the electronic device 800. The power component 806 may include a power management system, one or more power supplies, and other components associated with generation, management and distribution of power for the electronic device 800.

The multimedia component 808 includes a screen providing an output interface between the electronic device 800 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, slides and gestures on the TP. The touch sensors may not only sense a boundary of a touch or slide action but also detect a duration and pressure associated with the touch or slide action. In some embodiments, the multimedia component 808 includes a front camera and/or a rear camera. The front camera and/or the rear camera may receive external multimedia data when the electronic device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the electronic device 800 is in the operation mode, such as a call mode, a recording mode and a voice recognition mode. The received audio signal may further be stored in the memory 804 or sent through the communication component 816. In some embodiments, the audio component 810 further includes a speaker configured to output the audio signal.

The I/O interface 812 provides an interface between the processing component 802 and a peripheral interface module, and the peripheral interface module may be a keyboard, a click wheel, a button and the like. The button may include, but not limited to: a home button, a volume button, a starting button and a locking button.

The sensor component 814 includes one or more sensors configured to provide status assessment in various aspects for the electronic device 800. For instance, the sensor component 814 may detect an on/off status of the electronic device 800 and relative positioning of components, for example, the components are a display and small keyboard of the electronic device 800, and the sensor component 814 may further detect a change in a position of the electronic device 800 or a component of the electronic device 800, presence or absence of contact between the user and the electronic device 800, orientation or acceleration/deceleration of the electronic device 800 and a change in temperature of the electronic device 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is configured to facilitate wired or wireless communication between the electronic device 800 and another device. The electronic device 800 may access a communication-standard-based wireless network, such as a Wireless Fidelity (WiFi) network, a 2nd-Generation (2G) or 3rd-Generation (3G) network or a combination thereof. In an exemplary embodiment, the communication component 816 receives a broadcast signal or broadcast associated information from an external broadcast management system through a broadcast channel In an exemplary embodiment, the communication component 816 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and another technology.

In the exemplary embodiment, the electronic device 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In the exemplary embodiment, a non-transitory computer-readable storage medium is also provided, for example, a memory 804 including a computer program instruction. The computer program instruction may be executed by a processor 820 of an electronic device 800 to implement the abovementioned method.

Figure 6:
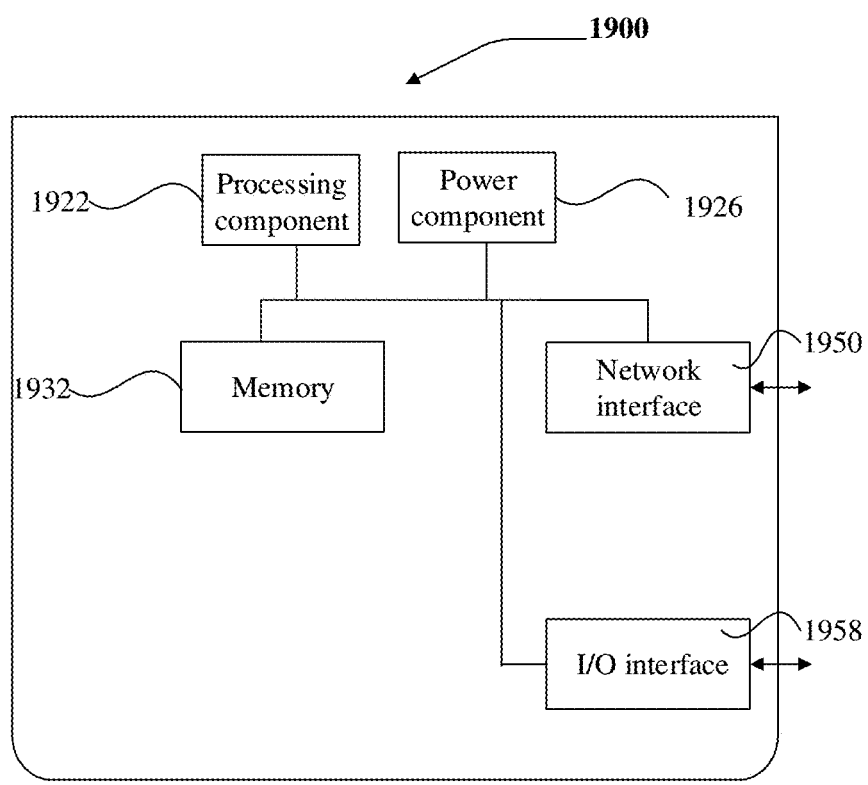
FIG. 6 is a block diagram of an electronic device according to an embodiment of the disclosure.

FIG. 6 is a block diagram of an electronic device 1900 according to an embodiment of the disclosure. For example, the electronic device 1900 may be provided as a server. Referring to FIG. 6, the electronic device 1900 includes a processing component 1922 which includes one or more processors, and a memory resource represented by a memory 1932, configured to store an instruction executable by the processing component 1922, for example, an application program. The application program stored in the memory 1932 may include one or more than one module of which each corresponds to a set of instructions. In addition, the processing component 1922 is configured to execute the instruction to execute the abovementioned method.

The electronic device 1900 may further include a power component 1926 configured to execute power management of the electronic device 1900, a wired or wireless network interface 1950 configured to connect the electronic device 1900 to a network, and an I/O interface 1958. The electronic device 1900 may be operated based on an operating system stored in the memory 1932, for example, Windows Server™, Mac OS X™, Unix™, Linux™, FreeBSD™ or the like.

In the exemplary embodiment, a non-transitory computer-readable storage medium is also provided, for example, a memory 1932 including a computer program instruction. The computer program instruction may be executed by a processing component 1922 of an electronic device 1900 to implement the abovementioned method.

The disclosure may be a system, a method and/or a computer program product. The computer program product may include a computer-readable storage medium, having stored thereon a computer-readable program instruction that, when executed by a processor, causes the processor to implement each aspect of the disclosure.

The computer-readable storage medium may be a physical device capable of retaining and storing an instruction used by an instruction execution device. For example, the computer-readable storage medium may be, but not limited to, an electric storage device, a magnetic storage device, an optical storage device, an electromagnetic storage device, a semiconductor storage device or any appropriate combination thereof. More specific examples (non-exhaustive list) of the computer-readable storage medium include a portable computer disk, a hard disk, a Random Access Memory (RAM), a ROM, an EPROM (or a flash memory), an SRAM, a Compact Disc Read-Only Memory (CD-ROM), a Digital Video Disk (DVD), a memory stick, a floppy disk, a mechanical coding device, a punched card or in-slot raised structure with an instruction stored therein, and any appropriate combination thereof. Herein, the computer-readable storage medium is not explained as a transient signal, for example, a radio wave or another freely propagated electromagnetic wave, an electromagnetic wave propagated through a wave guide or another transmission medium (for example, a light pulse propagated through an optical fiber cable) or an electric signal transmitted through an electric wire.

The computer-readable program instruction described here may be downloaded from the computer-readable storage medium to each computing/processing device or downloaded to an external computer or an external storage device through a network such as the Internet, a Local Area Network (LAN), a Wide Area Network (WAN) and/or a wireless network. The network may include a copper transmission cable, optical fiber transmission, wireless transmission, a router, a firewall, a switch, a gateway computer and/or an edge server. A network adapter card or network interface in each computing/processing device receives the computer-readable program instruction from the network and forwards the computer-readable program instruction for storage in the computer-readable storage medium in each computing/processing device.

The computer program instruction configured to execute the operations of the disclosure may be an assembly instruction, an Instruction Set Architecture (ISA) instruction, a machine instruction, a machine related instruction, a microcode, a firmware instruction, state setting data or a source code or target code edited by one or any combination of more programming languages, the programming language including an object-oriented programming language such as Smalltalk and C++ and a conventional procedural programming language such as "C" language or a similar programming language. The computer-readable program instruction may be completely executed in a computer of a user or partially executed in the computer of the user, executed as an independent software package, executed partially in the computer of the user and partially in a remote computer, or executed completely in the remote server or a server. Under the condition that the remote computer is involved, the remote computer may be connected to the computer of the user through any type of network including an LAN or a WAN, or, may be connected to an external computer (for example, connected by an Internet service provider through the Internet). In some embodiments, an electronic circuit such as a programmable logic circuit, an FPGA or a Programmable Logic Array (PLA) may be customized by use of state information of a computer-readable program instruction, and the electronic circuit may execute the computer-readable program instruction, thereby implementing each aspect of the disclosure.

Herein, each aspect of the disclosure is described with reference to flowcharts and/or block diagrams of the method, device (system) and computer program product according to the embodiments of the disclosure. It should be understood that each block in the flowcharts and/or the block diagrams and a combination of various blocks in the flowcharts and/or the block diagrams may be implemented by computer-readable program instructions.

These computer-readable program instructions may be provided for a universal computer, a dedicated computer or a processor of another programmable data processing device, thereby generating a machine to further generate a device that realizes a function/action specified in one or more blocks in the flowcharts and/or the block diagrams when the instructions are executed through the processor of the computer or the other programmable data processing device. These computer-readable program instructions may also be stored in a computer-readable storage medium, and through these instructions, the computer, the programmable data processing device and/or another device may work in a specific manner, so that the computer-readable medium including the instructions includes a product including instructions for implementing each aspect of the function/action specified in one or more blocks in the flowcharts and/or the block diagrams.

These computer-readable program instructions may further be loaded to the computer, the other programmable data processing device or the other device, so that a series of operating actions are executed in the computer, the other programmable data processing device or the other device to generate a process implemented by the computer to further realize the function/action specified in one or more blocks in the flowcharts and/or the block diagrams by the instructions executed in the computer, the other programmable data processing device or the other device.

The flowcharts and block diagrams in the drawings illustrate probably implemented system architectures, functions and operations of the system, method and computer program product according to multiple embodiments of the disclosure. On this aspect, each block in the flowcharts or the block diagrams may represent part of a module, a program segment or an instruction, and part of the module, the program segment or the instruction includes one or more executable instructions configured to realize a specified logical function. In some alternative implementations, the functions marked in the blocks may also be realized in a sequence different from those marked in the drawings. For example, two continuous blocks may actually be executed substantially concurrently or may be executed in a reverse sequence sometimes, which is determined by the involved functions. It is further to be noted that each block in the block diagrams and/or the flowcharts and a combination of the blocks in the block diagrams and/or the flowcharts may be implemented by a dedicated hardware-based system configured to execute a specified function or operation or may be implemented by a combination of a special hardware and a computer instruction.

Different embodiments of the disclosure may be combined without departing from logics, different embodiments are described with different emphases, and un-emphasized parts may refer to records in the other embodiments.

Various embodiments of the disclosure have been described above. The above descriptions are exemplary, non-exhaustive and also not limited to each disclosed embodiment. Many modifications and variations are apparent to those of ordinary skill in the art without departing from the scope and spirit of each described embodiment of the disclosure. The selection of the terms used herein is intended to best explain the principle and practical application of each embodiment or improvements in the technologies in the market or enable others of ordinary skill in the art to understand each embodiment disclosed herein.

The invention claimed is:

1. A method for image generation, comprising:
generating a first image of a target object according to a line image of the target object;
performing structure extraction on the first image to obtain at least one of texture information or orientation information of the first image; and
generating a second image of the target object according to the at least one of the texture information or the orientation information,
wherein performing structure extraction on the first image to obtain the at least one of the texture information or the orientation information of the first image comprises:
performing first filtering processing on each pixel of the first image to obtain a first filtering result of the pixel;
determining, according to the first filtering result of each pixel, at least one of preliminary texture information or preliminary orientation information of the pixel;
performing second filtering processing on the at least one of the preliminary texture information or the preliminary orientation information of each pixel to obtain a second filtering result of the pixel; and
determining the at least one of the texture information or the orientation information of the first image according to the second filtering result of each pixel,
wherein performing first filtering processing on each pixel of the first image to obtain the first filtering result of the pixel comprises:
performing first filtering processing on each pixel according to a plurality of preset angles to obtain a plurality of first filtering results of the pixel, and
wherein determining, according to the first filtering result of each pixel, the at least one of the preliminary texture information or the preliminary orientation information of the pixel comprises at least one of:
determining the preliminary texture information of each pixel according to a maximum value in the plurality of first filtering results of the pixel, or
determining the preliminary orientation information of each pixel according to an angle corresponding to the maximum value in the plurality of first filtering results of the pixel.

2. The method of claim 1, wherein performing structure extraction on the first image to obtain the at least one of the texture information or the orientation information of the first image comprises:
performing filtering processing on each pixel of the first image to obtain a filtering result of the pixel; and
determining the at least one of the texture information or the orientation information of the first image according to the filtering result of each pixel.

3. The method of claim 2, wherein performing filtering processing on each pixel of the first image to obtain the filtering result of the pixel comprises:
performing filtering processing on each pixel according to the plurality of preset angles to obtain a plurality of filtering results of the pixel; and
determining the at least one of the texture information or the orientation information of the first image according to the filtering result of each pixel comprises at least one of:
determining the texture information of the first image according to a maximum value in the plurality of filtering results of each pixel, or
determining the orientation information of the first image according to an angle corresponding to the maximum value in the plurality of filtering results of each pixel.

4. The method of claim 1, wherein performing second filtering processing on the at least one of the preliminary texture information or the preliminary orientation information of each pixel to obtain the second filtering result of the pixel comprises:
performing second filtering processing on the at least one of the preliminary texture information or the preliminary orientation information of each pixel according to the plurality of preset angles to obtain a plurality of second filtering results of the pixel; and
determining the at least one of the texture information or the orientation information of the first image according to the second filtering result of each pixel comprises at least one of:
determining the texture information of the first image according to a maximum value in the plurality of second filtering results of each pixel, or
determining the orientation information of the first image according to an angle corresponding to the maximum value in the plurality of second filtering results of each pixel.

5. The method of claim 1, implemented through a neural network, wherein the neural network comprises a first generation network and a second generation network, the first generation network is configured to generate the first image, and the second generation network is configured to generate the second image.

6. The method of claim 5, wherein the first generation network comprises a first convolutional subnetwork and a first deconvolution subnetwork, and generating the first image of the target object according to the line image of the target object comprises:
inputting the line image into the first convolutional subnetwork for down-sampling, and outputting first feature information of the line image; and
inputting the first feature information into the first deconvolution subnetwork for up-sampling, and outputting the first image.

7. The method of claim 6, wherein the second generation network comprises a second convolutional subnetwork and a second deconvolution subnetwork, and generating the second image of the target object according to the at least one of the texture information or the orientation information comprises:
inputting the at least one of the texture information or the orientation information into the second convolutional subnetwork for down-sampling, and outputting second feature information; and
inputting the second feature information into the second deconvolution subnetwork for up-sampling, and outputting the second image.

8. The method of claim 5, wherein the neural network further comprises a discriminative network; and the method further comprises:

performing adversarial training on the first generation network, the second generation network and the discriminative network according to a preset training set,
wherein the preset training set comprises a plurality of third images and a respective reference image corresponding to each third image, the third image is a line image and the reference image is a real image.

9. The method of claim 8, wherein performing adversarial training on the first generation network, the second generation network and the discriminative network according to the preset training set comprises:
inputting the third image in the preset training set into the first generation network to generate a fourth image;
performing structure extraction on the fourth image through a filter to obtain at least one of texture information or orientation information of the fourth image;
inputting the at least one of the texture information or the orientation information of the fourth image into the second generation network to generate a fifth image;
inputting the reference image of the third image and the fifth image into the discriminative network, and outputting a discrimination result;
determining network loss of the neural network according to the reference image, the fourth image, the fifth image and the discrimination result; and
training the first generation network, the second generation network and the discriminative network according to the network loss.

10. The method of claim 9, wherein determining the network loss of the neural network according to the reference image, the fourth image, the fifth image and the discrimination result comprises:
determining pixel loss of the neural network according to the reference image, the fourth image and the fifth image;
determining adversarial loss of the neural network according to the discrimination result;
determining style loss of the neural network according to the reference image, the fourth image, the fifth image and a trained convolutional network; and
determining the network loss of the neural network according to the pixel loss, the adversarial loss and the style loss.

11. The method of claim 10, wherein determining the network loss of the neural network according to the reference image, the fourth image, the fifth image and the discrimination result further comprises:
determining feature matching loss of the neural network according to the reference image, the fourth image, the fifth image and the discriminative network; and
determining the network loss of the neural network according to the pixel loss, the adversarial loss, the style loss and the feature matching loss.

12. The method of claim 1, wherein the target object comprises hair, and the line image of the target object at least comprises a contour line and an orientation line of the hair.

13. An electronic device, comprising:
a processor; and
a memory configured to store instructions that, when executed by the processor, cause the processor to perform a method for image generation comprising:
generating a first image of a target object according to a line image of the target object;
performing structure extraction on the first image to obtain at least one of texture information or orientation information of the first image; and
generating a second image of the target object according to the at least one of the texture information or the orientation information,
wherein the processor is configured to:
perform first filtering processing on each pixel of the first image to obtain a first filtering result of the pixel;
determine, according to the first filtering result of each pixel, at least one of preliminary texture information or preliminary orientation information of the pixel;
perform second filtering processing on the at least one of the preliminary texture information or the preliminary orientation information of each pixel to obtain a second filtering result of the pixel; and
determine the at least one of the texture information or the orientation information of the first image according to the second filtering result of each pixel,
wherein the processor is configured to:
perform first filtering processing on each pixel according to a plurality of preset angles to obtain a plurality of first filtering results of the pixel, and
wherein the processor is further configured to perform at least one of:
determining the preliminary texture information of each pixel according to a maximum value in the plurality of first filtering results of the pixel, or
determining the preliminary orientation information of each pixel according to an angle corresponding to the maximum value in the plurality of first filtering results of the pixel.

14. The electronic device of claim 13, wherein the processor is configured to:
perform filtering processing on each pixel of the first image to obtain a filtering result of the pixel; and
determine the at least one of the texture information or the orientation information of the first image according to the filtering result of each pixel.

15. The electronic device of claim 14, wherein the processor is configured to:
perform filtering processing on each pixel according to the plurality of preset angles to obtain a plurality of filtering results of the pixel; and
the processor is further configured to perform at least one of:
determining the texture information of the first image according to a maximum value in the plurality of filtering results of each pixel, or
determining the orientation information of the first image according to an angle corresponding to the maximum value in the plurality of filtering results of each pixel.

16. The electronic device of claim 13,
wherein the processor is configured to:
perform second filtering processing on the at least one of the preliminary texture information or the preliminary orientation information of each pixel according to the plurality of preset angles to obtain a plurality of second filtering results of the pixel; and
the processor is further configured to perform at least one of:
determining the texture information of the first image according to a maximum value in the plurality of second filtering results of each pixel, or
determining the orientation information of the first image according to an angle corresponding to the maximum value in the plurality of second filtering results of each pixel.

17. A non-transitory computer-readable storage medium, having stored thereon a computer program instruction that, when executed by a processor of an electronic device, causes the processor to perform a method for image generation comprising:
- generating a first image of a target object according to a line image of the target object;
- performing structure extraction on the first image to obtain at least one of texture information or orientation information of the first image; and
- generating a second image of the target object according to the at least one of the texture information or the orientation information,
- wherein performing structure extraction on the first image to obtain the at least one of the texture information or the orientation information of the first image comprises:
    - performing first filtering processing on each pixel of the first image to obtain a first filtering result of the pixel;
    - determining, according to the first filtering result of each pixel, at least one of preliminary texture information or preliminary orientation information of the pixel;
    - performing second filtering processing on the at least one of the preliminary texture information or the preliminary orientation information of each pixel to obtain a second filtering result of the pixel; and
    - determining the at least one of the texture information or the orientation information of the first image according to the second filtering result of each pixel,
- wherein performing first filtering processing on each pixel of the first image to obtain the first filtering result of the pixel comprises:
    - performing first filtering processing on each pixel according to a plurality of preset angles to obtain a plurality of first filtering results of the pixel, and
- wherein determining, according to the first filtering result of each pixel, the at least one of the preliminary texture information or the preliminary orientation information of the pixel comprises at least one of:
    - determining the preliminary texture information of each pixel according to a maximum value in the plurality of first filtering results of the pixel, or
    - determining the preliminary orientation information of each pixel according to an angle corresponding to the maximum value in the plurality of first filtering results of the pixel.

* * * * *